United States Patent [19]
Yaginuma et al.

[11] Patent Number: 5,377,064
[45] Date of Patent: Dec. 27, 1994

[54] STRUCTURE FOR SUPPORTING A SLIDER WITH MAGNETIC HEAD FOR A LINEAR MAGNETIC DISK UNIT

[75] Inventors: Yasuhiro Yaginuma, Hiratsuka; Jyousei Shimizu; Tetsuo Masukawa, both of Odawara; Noriki Une, Hiratsuka; Shigeo Nakamura, Odawara; Masami Miyatake, Kanagawa; Mikio Tokuyama, Tsukuba; Yoshinori Takeuchi, Ishioka; Satomitsu Imai, Ibaraki; Kenji Mori, Tsuchiura, all of Japan

[73] Assignee: Hitachi, Ltd., Tokyo, Japan

[21] Appl. No.: 117,442

[22] Filed: Sep. 7, 1993

[30] Foreign Application Priority Data

Sep. 7, 1992 [JP] Japan .................................. 4-238468
Mar. 18, 1993 [JP] Japan .................................. 5-058401

[51] Int. Cl.⁵ .................................................. G11B 5/48
[52] U.S. Cl. .................................................. 360/104
[58] Field of Search .................................. 360/104–106

[56] References Cited

U.S. PATENT DOCUMENTS 5,282,102 1/1994 Christianson ........................ 360/104

Primary Examiner—A. J. Heinz
Attorney, Agent, or Firm—Antonelli, Terry, Stout & Kraus

[57] ABSTRACT

A structure for supporting a magnetic head slider for a linear magnetic disk unit comprises: a magnetic head slider having air bearing rails located opposite to a magnetic disk so as to extend in a direction of a track of the magnetic disk; a gimbal for elastically supporting the magnetic head slider, the gimbal being bonded to a back surface of the magnetic head slider on a side reverse to the air bearing rail; and a support arm having the gimbal secured to its distal end, whose axis extends in a direction perpendicular to the air bearing rail, which support arm gives the magnetic head slider a pressing force toward the magnetic disk. The gimbal includes: a substantially rectangular joining portion to be bonded to the back surface of the magnetic head slider, the joining portion having longer sides extending in a direction perpendicular to the axis of the support arm and shorter sides extending in the axial direction of the support arm; a bridging portion to be bonded to the back face of the magnetic head slider, the bridging portion extending from a middle portion of the lower side of the joining portion on the opposite side to the support arm outwardly in the axial direction of the support arm; flexible portions extending from the bridging portion so as to surround the bridging portion and the joining portion; and a support portion extending from the flexible portions on the opposite side to the bridging portion rearward in the axial direction of the support arm.

33 Claims, 9 Drawing Sheets

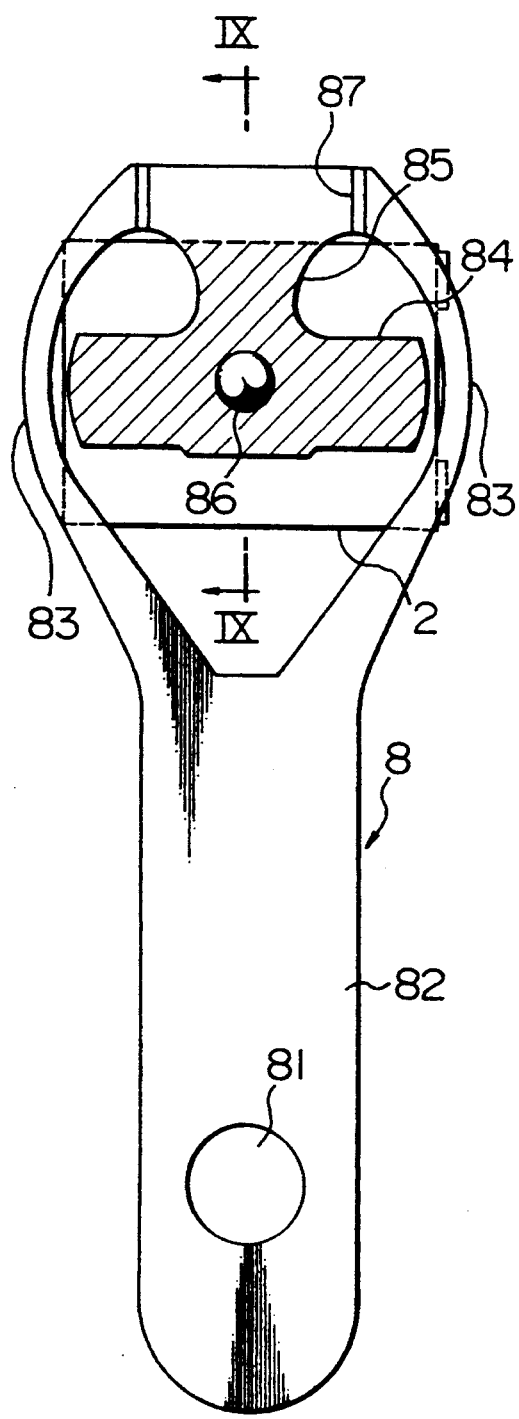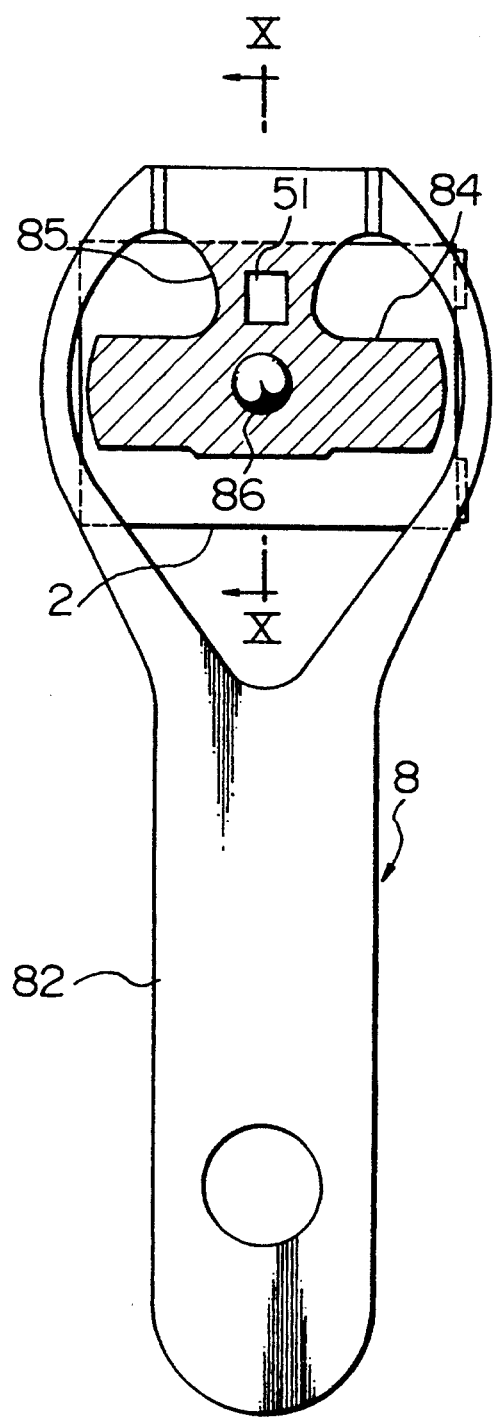

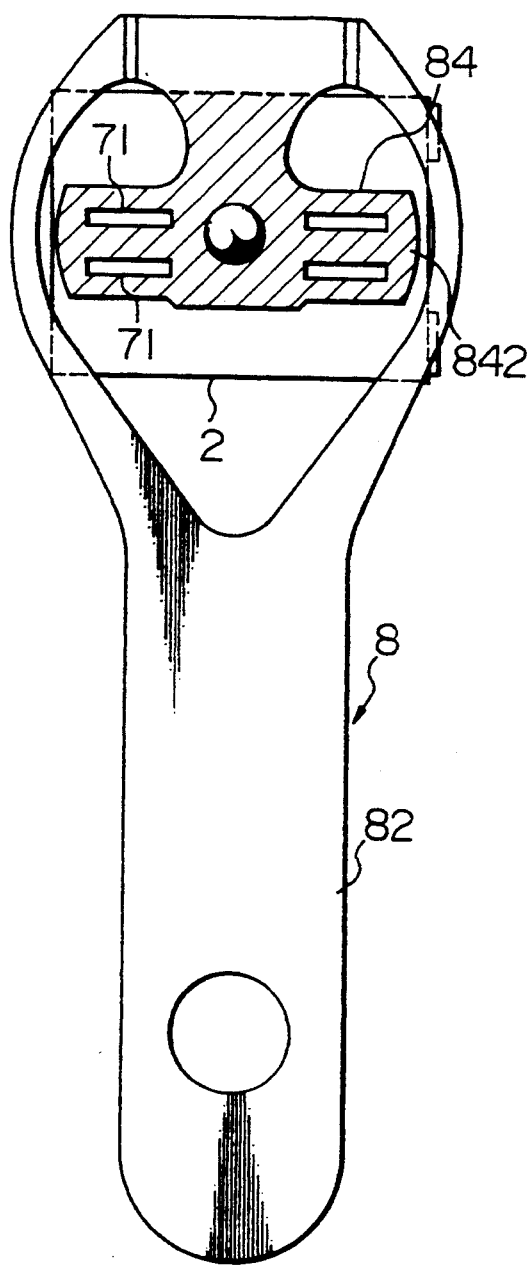
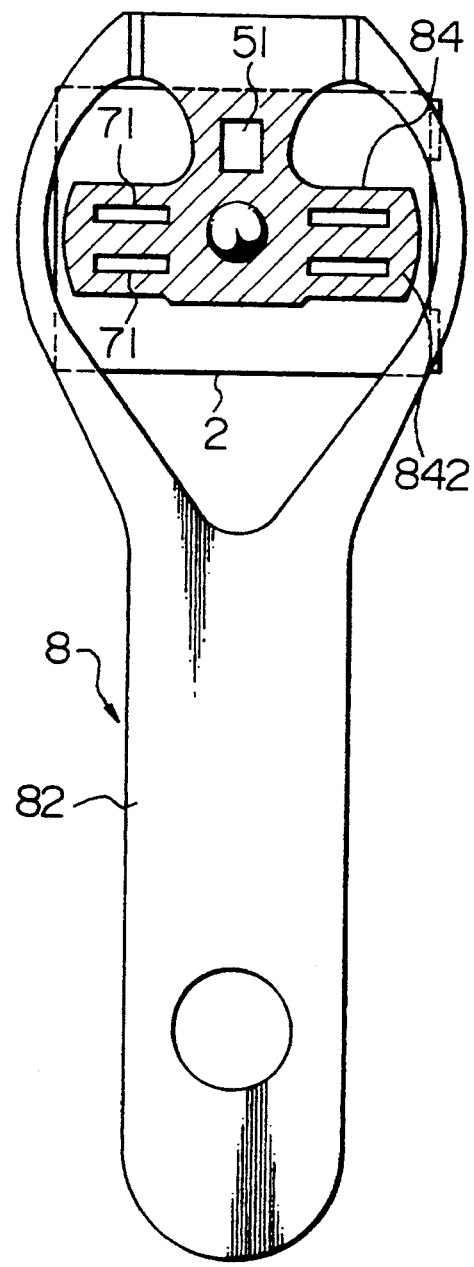

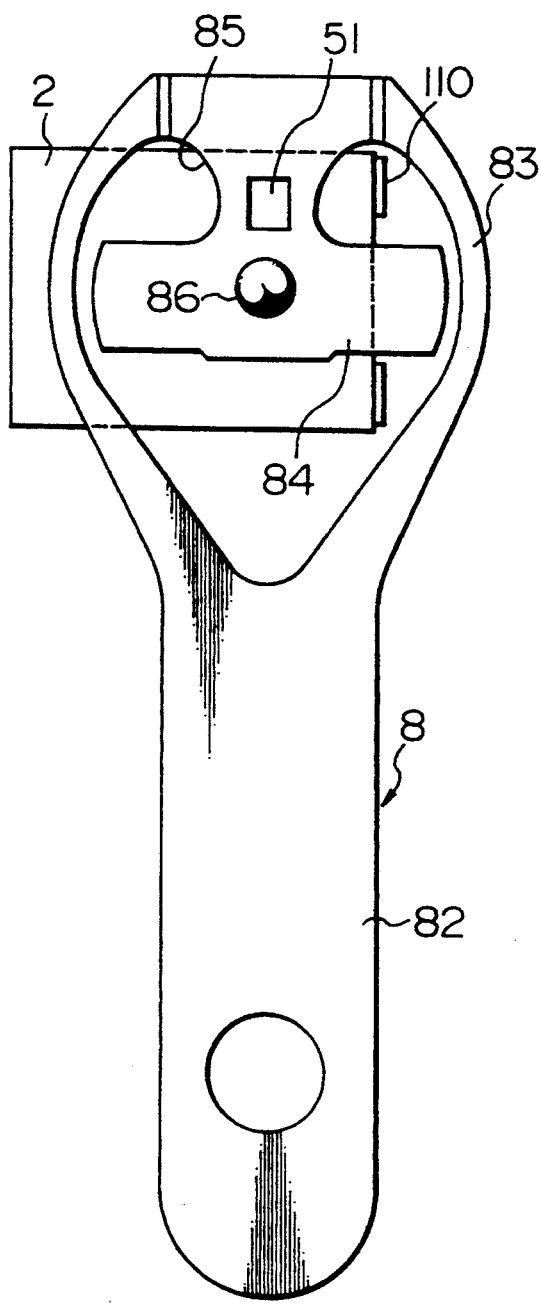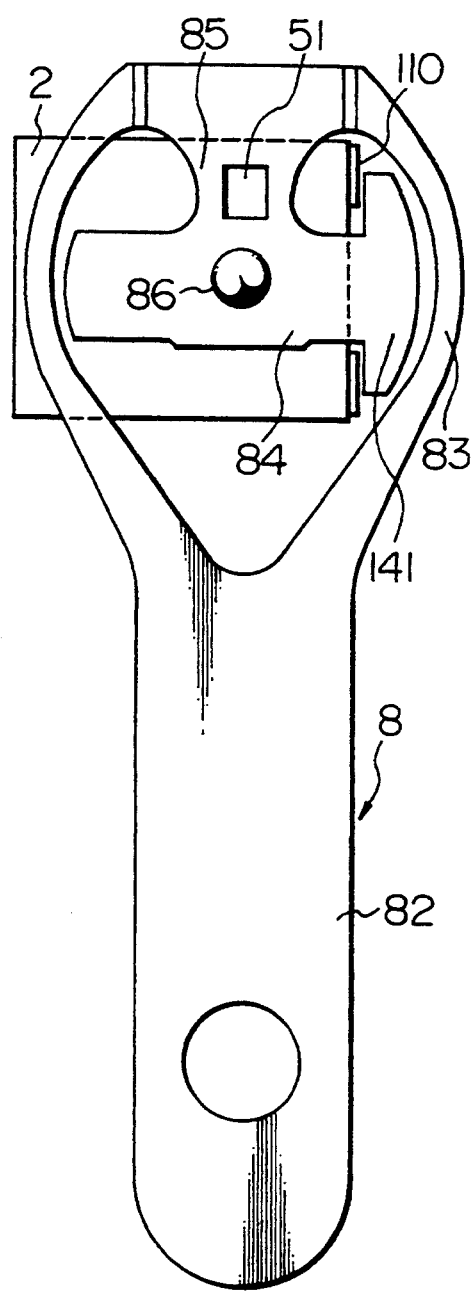

STRUCTURE FOR SUPPORTING A SLIDER WITH MAGNETIC HEAD FOR A LINEAR MAGNETIC DISK UNIT

BACKGROUND OF THE INVENTION

The present invention relates to a structure for supporting a slider with a magnetic head for a linear magnetic disk unit and more particularly, to a structure for satisfactorily supporting a small-sized slider with a magnetic head.

Generally, a linear magnetic disk unit has such a construction that a slider including a magnetic head is elastically sustained by a gimbal and a support arm, the slider being flown over the magnetic disk so that recording or reproduction of data is performed by the magnetic head.

In a structure for supporting a slider with a magnetic head for the linear magnetic disk unit, the gimbal attached to a distal end of the support arm is located perpendicularly to a longitudinal direction of the slider. A joining portion of the gimbal with a back surface of the slider extends in a direction perpendicular to the longitudinal direction of the slider. For the reasons, a contact area by adhesion between the joining portion of the gimbal and the back surface of the slider decreases in accordance with a tendency of size reduction of the slider, so that an adhering strength between the slider and the gimbal is unfavorably lowered. Thus, for some reasons, when the slider and the magnetic disk come in contact with each other, the slider detaches from the joining portion of the gimbal and collides against the magnetic disk, which results in a so-called crash accident by which the data on the magnetic disk is broken.

In the assembling process, the slider and the gimbal are bonded to each other at a high temperature. When the temperatures of the slider and the gimbal return to the normal temperature after the bonding, a curvature deformation (referred to as a camber hereinafter) occurs in the slider in a lateral direction thereof owing to a difference between coefficients of thermal expansion of the slider and the gimbal. An amount of camber depends on a length of the bonding portion in the lateral direction of the slider. In the gimbal of the prior art, as mentioned above, the joining portion of the gimbal extends in a lateral direction of the slider or in the direction perpendicular to the longitudinal direction of the slider, and it is adhered to the back surface of the slider over the entire length in the widthwise direction. The amount of camber generated in the slider is large so that such a problem occurs that a data reading and writing performance of the magnetic disk unit is deteriorated. The large amount of camber has a possibility, when the slider is stopped, that a portion of the slider may accidentally come into contact with the surface of the magnetic disk and the magnetic disk will be damaged.

SUMMARY OF THE INVENTION

An object of the invention is to provide a structure for supporting a magnetic head slider for a linear magnetic disk unit, in which the magnetic head slider and a joining portion of a gimbal can firmly be bonded and fixed to each other and an amount of camber generated in the magnetic head slider is minimized, the structure being suitable for satisfactorily supporting a small-sized magnetic head slider.

The structure for supporting a magnetic head slider for a linear magnetic disk unit, according to the invention, comprises: a magnetic head slider, the slider having air bearing rails located opposite to a magnetic disk so as to extend in a direction of a track of the magnetic disk; a gimbal for elastically supporting the magnetic head slider, the gimbal being bonded to a back surface of the magnetic head slider on a side reverse to the air bearing rail; and a support arm having the gimbal secured to its distal end, whose axis extends in a direction perpendicular to the air bearing rail, which support arm gives the magnetic head slider a pressing force toward the magnetic disk. The gimbal includes: a substantially rectangular joining portion to be bonded to the back surface of the magnetic head slider, the joining portion having longer sides extending in a direction perpendicular to the axis of the support arm and shorter sides extending in the axial direction of the support arm; a bridging portion to be bonded to the back surface of the magnetic head slider, the bridging portion extending from a middle portion of the longer side of the joining portion on the opposite side to the support arm outwardly in the axial direction of the support arm; flexible portions extending from the bridging portion so as to surround the bridging portion and the joining portion; and a support portion extending from the flexible portions on the opposite side to the bridging portion rearward in the axial direction of the support arm. At least one substantially rectangular opening portion is provided on at least one of the joining portion and the bridging portion.

BRIEF DESCRIPTION OF THE DRAWINGS

FIG. 3 is a plan view of the first embodiment of the supporting structure of the magnetic head slider according to the invention;

FIGS. 6 to 8 are plan views of modified forms of the first embodiment, respectively;

FIG. 11 is a plan view of a second embodiment of the supporting structure of the magnetic head slider according to the invention;

FIGS. 13 and 14 are plan views of modified forms of the second embodiment, respectively;

DETAILED DESCRIPTION OF THE PREFERRED EMBODIMENTS

Preferred embodiments of the present invention will be described hereinafter with reference to the accompanying drawings.

Figure 1:
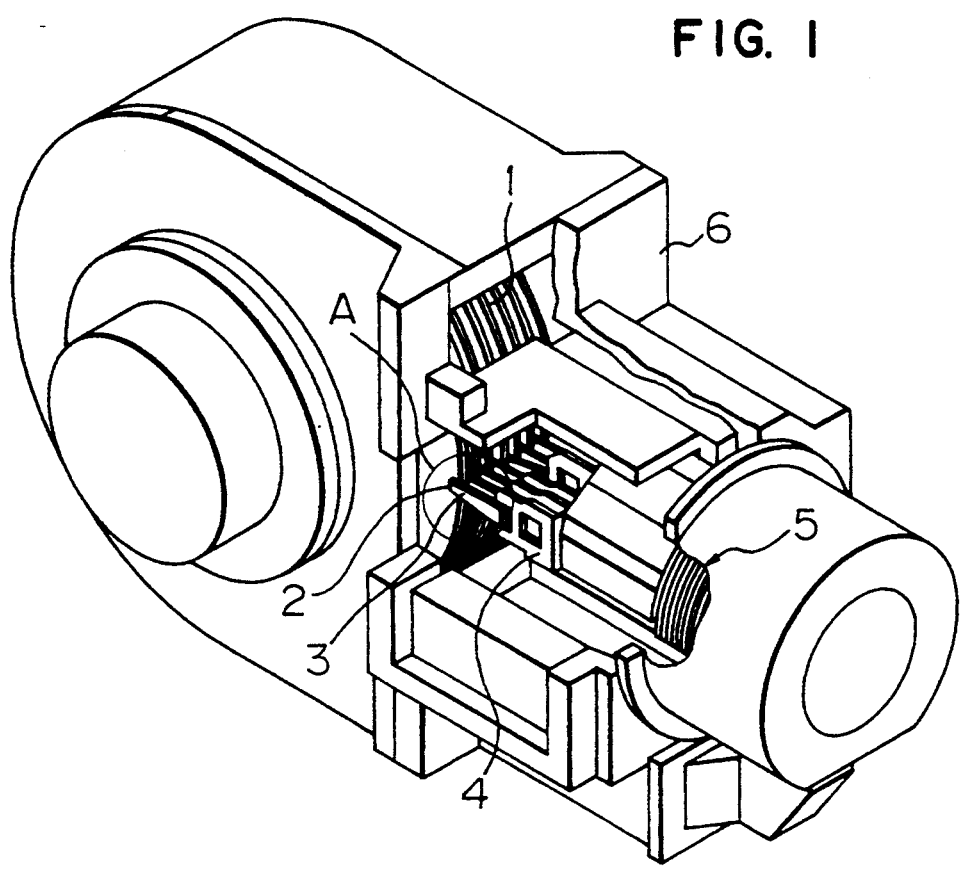
FIG. 1 is a partially cutaway perspective view of a linear magnetic disk unit in which a supporting structure of a magnetic head slider according to the invention is installed.

Referring to FIG. 1, a number of magnetic disks 1 are fitted on a shaft and arrayed in parallel relation. The magnetic disks 1 are rotatably driven by means of a motor connected to the shaft. A magnetic head for reading data recorded on a surface of the magnetic disk 1 or writing data on the magnetic disk 1, is mounted on a slider 2. The slider 2 is held by a support mechanism 3 comprising a gimbal and a support arm. The support mechanism 3 is connected to a positioning mechanism 5 via a guide arm 4. In the illustrated embodiment, the positioning mechanism 5 moves the slider 2 linearly in a radial direction of the magnetic disk 1 in order to locate the magnetic head. This type of magnetic disk unit is called a linear magnetic disk unit. The above-described magnetic disks 1, the sliders 2, the support mechanisms 3, the guide arms 4 and the positioning mechanism 5 are accommodated in a cover 6 which is kept clean.

Figure 2:
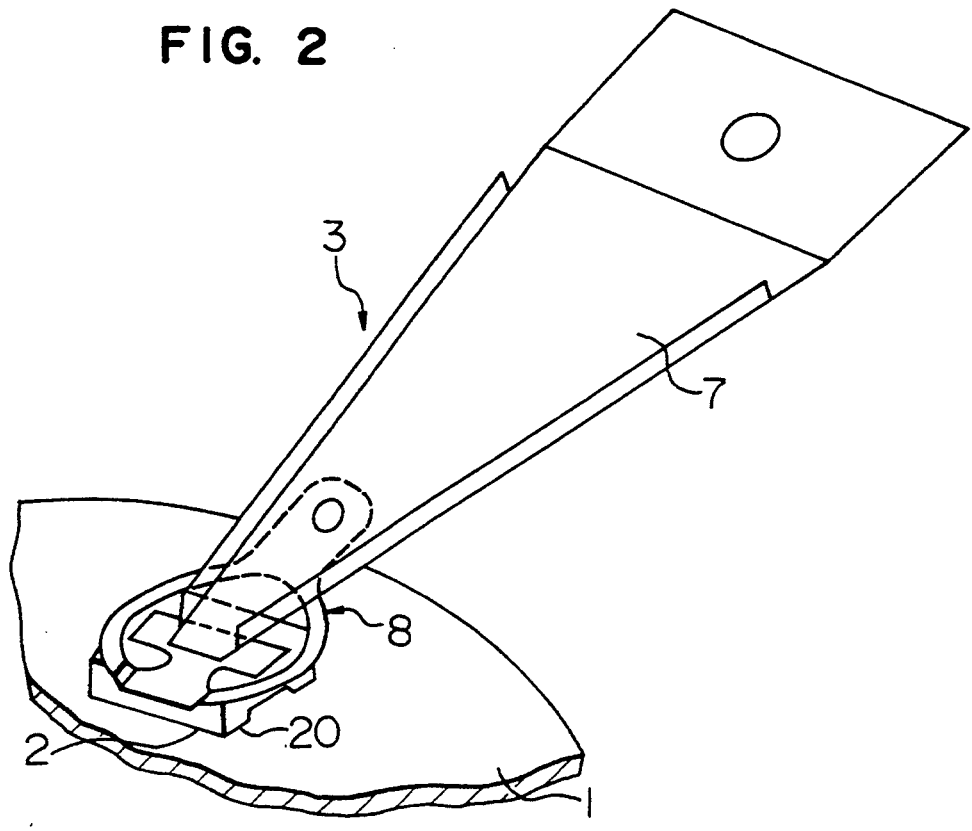
FIG. 2 is an enlarged perspective view of a portion A of FIG. 1, showing a first embodiment of the supporting structure of the magnetic head slider according to the invention.

FIG. 2 shows a first embodiment of a structure for supporting the magnetic head according to the invention. The structure for supporting the magnetic head slider comprises the slider 2 including air bearing rails 20 extending in a direction of a track of the magnetic disk 1, the support arm 7 extending perpendicularly to a longitudinal axis of the slider 2 and the gimbal 8 provided at the distal end of the support arm 7, the gimbal 8 interconnecting the distal end of the support arm 7 and the slider 2.

Figure 4:
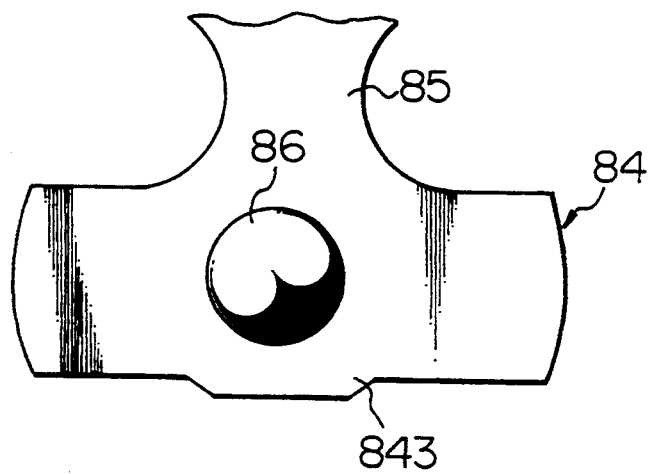
FIG. 4 is an enlarged plan view of a gimbal in FIG. 3.

Referring to FIGS. 3 and 4, the gimbal 8 includes: a substantially rectangular joining portion 84 having longer sides extending in a direction perpendicular to an axis of the support arm 7, i.e., in a longitudinal direction of the slider 2, and shorter sides extending in the axial direction of the support arm 7, i.e., in a widthwise direction of the slider 2; a bridging portion 85 extending from a middle portion of the longer side of the joining portion on a side opposite to the support arm outwardly in the widthwise direction of the slider 2; flexible portions 83 extending from the bridging portion 85 and surrounding the bridging portion 85 and the joining portion 84; and a support portion 82 extending from the flexible portions 83 on the side opposite to the bridging portion toward the support arm 7. The joining portion 84 and the bridging portion 85 are bonded to a back surface of the slider 2. As indicated by oblique lines in FIG. 3, the direction of the longer side of the joining portion 84 corresponds to the longitudinal direction of the slider 2, and the longer sides of the joining portion are bonded to the back surface of the slider 2 generally over the entire longitudinal length of the slider. Meanwhile, the shorter sides of the joining portion are not bonded to the back surface of the slider 2 over the entire length in the widthwise direction, but slightly partially bonded to the back surface of the slider in the widthwise direction.

An embossed portion 86 is formed at a substantially central portion of the joining portion 84, to protrude to the side opposite to the slider 2. The embossed portion 86 comes into contact with a lower face of the support arm 7 at the distal end thereof and transmits to the slider 2 a force for pressing the slider 2 of the support arm 7 against the magnetic disk 1.

In the case where an extension 843 is provided on the longer side of the joining portion 84 on the side of the support portion in opposition to the bridging portion 85, it becomes easy to form the embossed portion 86 by press-working. In actual, the extension 843 is protruded from the longer side by 0.1 to 0.5 mm.

The gimbal 8 is made of a thin-plate material. The joining portion 84 and the bridging portion 85 exist on a common plane; and the flexible portions 83 and the support portion 82 to be secured to the support arm 7 are on a plane above the above-described plane. These two planes are connected to each other through stepped portions 87 between the bridging portion 85 and the flexible portions 83. The stepped portions 87 extend in the same direction as the support portion 82, that is, in the axial direction of the support arm 7.

According to the first embodiment of the structure for supporting the magnetic head slider according to the invention, it is possible to obtain a sufficiently large bonding area of the joining portion 84 of the gimbal 8 and the back surface of the slider 2 in the longitudinal direction of the slider. Thus, the gimbal 8 and the slider 2, especially, a small-sized slider 2 can firmly be adhered to each other. As a result, it is possible to prevent the dislodging of the slider 2 from the gimbal 8 and to enhance a reliability of the magnetic disk unit.

Further, a portion of bonding between the gimbal 8 and the slider 2 in the widthwise direction of the slider does not extend over a length in the widthwise direction of the slider 2, and the extension of adhesion can be reduced to a half or less of that of the prior art. Accordingly, an amount of camber generated in the slider 2 due to a difference between coefficients of thermal expansion of the slider 2 and the gimbal 8 after the joining portion 84 of the gimbal 8 has been adhered to the back surface of the slider 2, can be minimized. As a result, a variation in flying height of the magnetic head can be decreased, thereby suppressing a data reading and writing performance of the magnetic disk unit from being deteriorated.

Because the flying height of the magnetic head can be corresponded to the minimum flying height of the slider, the recording density of the unit is heightened. Further, the small amount of camber prevents such an accident that a portion of the slider 2 violently comes into contact with the surface of the magnetic disk and damages the magnetic disk when the magnetic disk unit is stopped, thus improving the reliability of the unit.

The flexible portions 83 and the stepped portions 87 of the gimbal 8 extend in the widthwise direction of the slider, and they extend in the same direction as a direction of seeking by the positioning mechanism 5. As a result, since only tensile or compression force acts on the gimbal 8 during seeking, the rigidity of the gimbal 8 in the seeking direction can be maintained to be high. Therefore, a positioning accuracy of the magnetic head can be improved.

Figure 5:
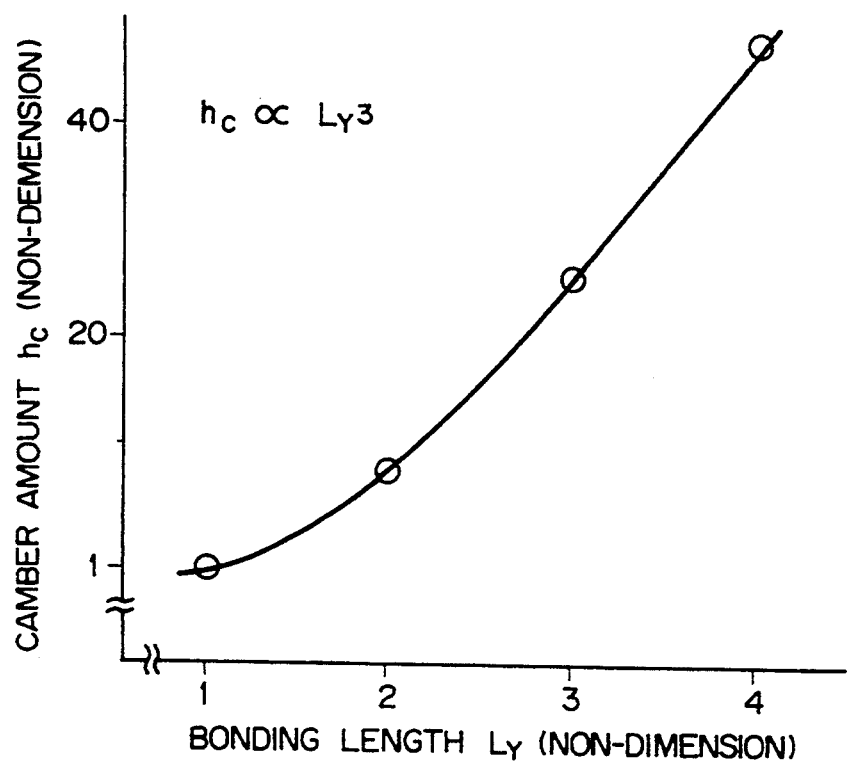
FIG. 5 is a graph indicating a relation between a length of bonding between the gimbal and a back surface of the slider and an amount of camber generated in the slider.

From the experimental analysis by the inventors of the present invention, as shown in FIG. 5, it has been found that an amount of camber generated in the slider increases in proportion to about the cube of the bonding length of the joining portion of the gimbal in the widthwise direction of the slider. Modified forms of the first embodiment based on the analysis result are shown in FIGS. 6 to 8.

In the modified form shown in FIG. 6, a substantially rectangular opening portion 51 is provided in the bridging portion 85 of the gimbal 8. Longer sides of the opening portion 51 extend in the widthwise direction of the slider 2.

With the structure, an effective bonding length between the slider 2 and the gimbal 8 in the widthwise direction of the slider can be further reduced. Thus, the camber can be suppressed more effectively as compared with the above-described first embodiment of the invention.

Moreover, assuming that an entire length of adhesion in the widthwise direction of the slider 2 is constant, an amount of chamber generated in the slider 2 is more decreased when the adhering portion is divided in several parts than when the adhering portion is continuous. More specifically, it is effective for decreasing the amount of camber to discontinuously bond the joining portion of the gimbal to the back surface of the slider in the widthwise direction thereof and to shorten the bonding length in the widthwise direction of the slider 2.

Another modified form of the first embodiment based on the above idea is illustrated in FIG. 7. In the illustrated form, a plurality of elongated opening portions 71 extending along the longitudinal direction of the slider 2 are provided on sections 842 of the joining portion 84 extended in the longitudinal direction of the slider.

With the structure, effects similar to the aforesaid first embodiment can be obtained. Since the bonding length of the joining portion 84 with respect to the back surface of the slider in the widthwise direction of the slider can further be reduced, the camber of the slider 2 can be suppressed more effectively than the first embodiment.

A modified form in FIG. 8 is obtained by combining the modified form in FIG. 6 and the modified form in FIG. 7. More specifically, the bridging portion 85 constituting the gimbal 8 is provided with the rectangular opening portion 51 and a plurality of elongated opening portions 71 extending along the longitudinal direction of the slider 2 are formed in the sections 842 of the joining portion 84 extended in the longitudinal direction of the slider.

With the structure, the bonding length in the widthwise direction of the slider can further be shortened, so that the camber of the slider 2 is decreased more effectively as compared with the above-mentioned embodiments.

Figure 9:
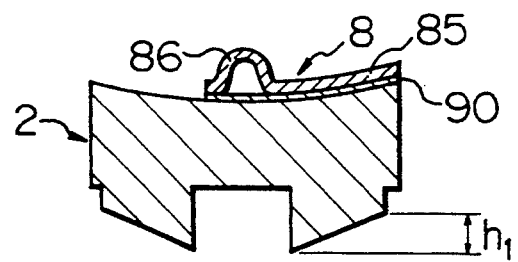
FIG. 9 is a cross-sectional view, taken along line IX—IX in FIG. 3.
Figure 10:
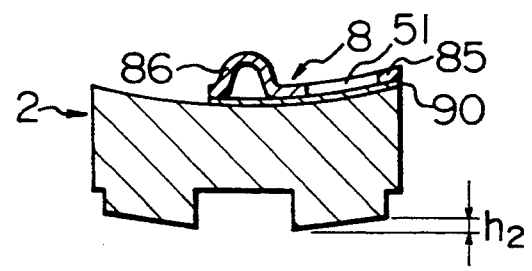
FIG. 10 is a cross-sectional view, taken along line X—X in FIG. 6.

FIGS. 9 and 10 are views for explanation of one example of a manner of reducing the camber of the slider. FIG. 9 illustrates the reducing manner in the embodiment of FIG. 3, and FIG. 10 illustrates the reducing manner in the modified example of FIG. 6. In these figures, reference numeral 90 denotes an adhesive.

As clearly understood from FIGS. 9 and 10, the camber h2 of FIG. 10 is smaller than the camber h1 of FIG. 9 and the effect for reducing the camber of the slider in the modified form in FIG. 6 is larger than that of the first embodiment. In the first embodiment of the invention shown in FIG. 9, the length of bonding in the widthwise direction of the slider becomes about a half of the bonding length in the prior art. In the modified form shown in FIG. 10, the length of bonding becomes about one fourth of that in the prior art.

Figure 12:
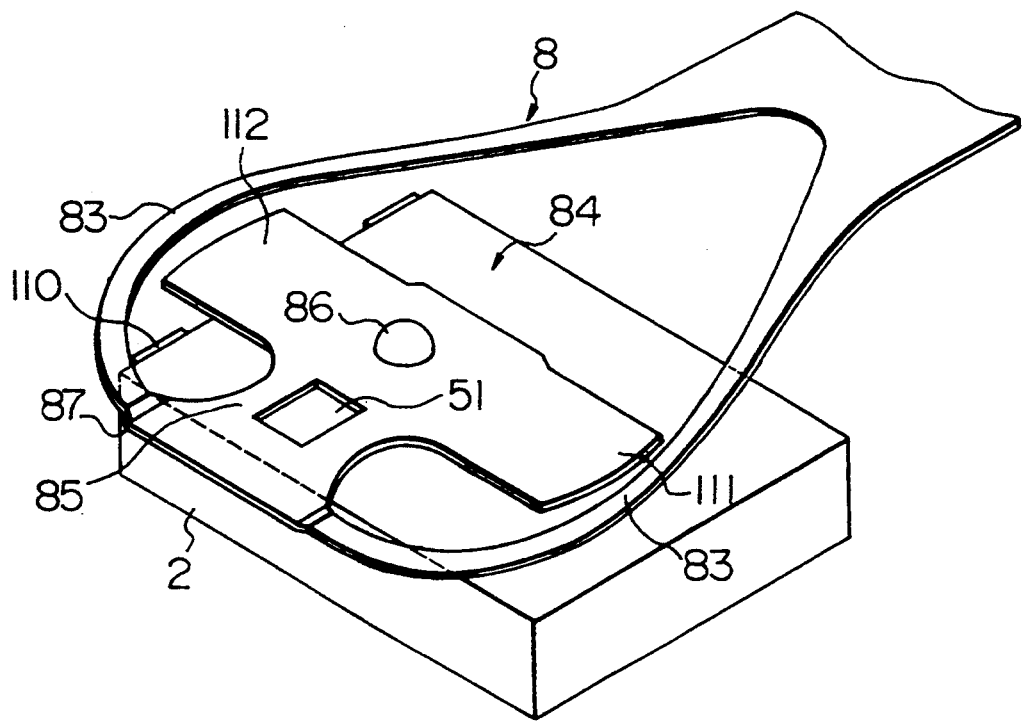
FIG. 12 is a perspective view of the second embodiment of the supporting structure of the magnetic head slider according to the invention.

A second embodiment of the structure for supporting the magnetic head slider according to the invention will be described hereinafter with reference to FIGS. 11 and 12.

The second embodiment is fundamentally similar to the modified form of the first embodiment shown in FIG. 6. A different point between them is that the gimbal 8 is adhered to a position offset to the side of a magnetic head 110 of the slider 2 so that a part of the the joining portion 84 of the gimbal 8 projects from the side of the magnetic head.

According to the second embodiment, similarly to the first embodiment, an area of adhesion of the joining portion 84 in the widthwise direction of the slider is decreased, so that the camber in the slider 2 can be reduced. Since the joining portion 84 extends in the longitudinal direction of the slider, it is possible to bond the joining portion 84 to the back surface of the slider 2 sufficiently firmly.

A part of the joining portion 84 projecting to the side of the magnetic head 110 prevents such an erroneous operation of the magnetic head 110 as to read or write due to electric noise from the exterior (the electric field and the like). Further, the projecting part of the joining portion 84 prevents the erroneous operation of another magnetic head from being caused by the electric noise generated by one magnetic head. This is because the projecting part serves as a shield when the gimbal 8 is made of a conductive material such as stainless steel.

This embodiment is suitable for a structure for supporting a magnetic head slider for a servo head which is always in a reading-out condition because the erroneous reading-out or writing-in operation of the magnetic head due to the electric noise such as the electric field can be prevented. Further, in a magnetic disk unit in which magnetic heads are provided between adjacent ones of magnetic disks arrayed in parallel relation so as to correspond to the surfaces of the respective magnetic disks, there is no mutual intervention between the magnetic heads. Therefore, it is possible to provide a magnetic disk unit having a high reliability in which the erroneous reading-out or writing-in operations are hardly performed. The above-described shield effect can be more improved by plating a highly conductive material such as gold on the projecting part of the joining portion.

In the second embodiment, the joining portion 84 is moved in the longitudinal direction of the slider 2 and adhered to the slider .2, and the embossed portion 86, that is, a point of application of load to the slider 2 is also moved, thereby controlling the flying posture of the slider 2 easily. As a result, a degree of freedom in designing can be increased.

FIG. 13 illustrates a modified form of the second embodiment. In this modified form, the projecting part of the joining portion 84 of the gimbal 8 from the side of the magnetic head is provided with an extension 141 in the widthwise direction of the slider. The extension 141 is elongated to above the magnetic heads 110.

In the modified form, because the projecting part from the side of the magnetic head extends in the vicinity of the magnetic head 110, the shield effect can be more improved.

Figure 14:
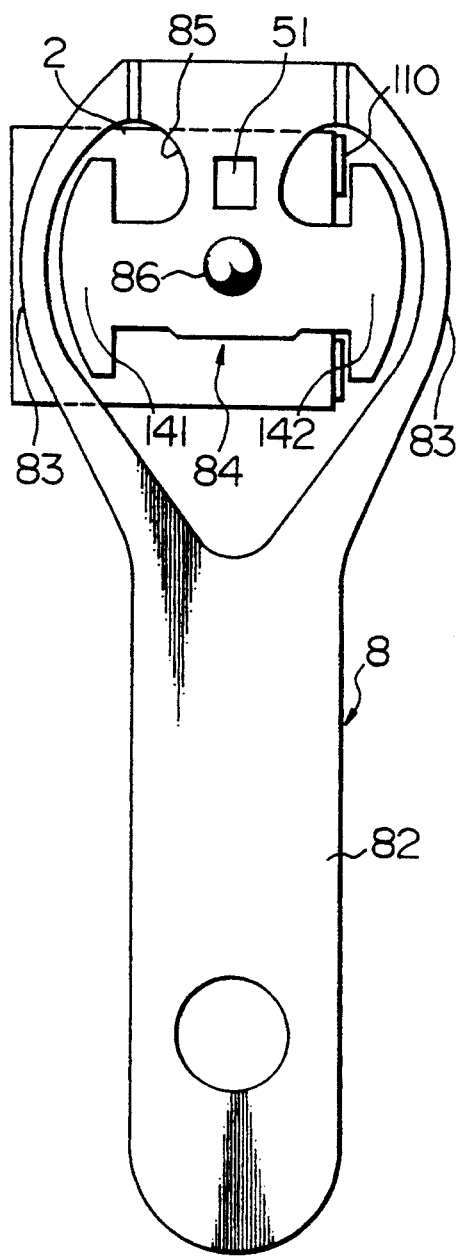

FIG. 14 shows a gimbal obtained by further modifying the modified form in FIG. 13. Another extension 142 is provided on the joining portion 84 of the gimbal 8 on the opposite side to the magnetic head, symmetrically with the extension 141.

With the structure, a length of bonding of the joining portion 84, at a leading end portion of the slider 2, in the widthwise direction of the slider is elongated, so that the camber generated at the leading end portion of the slider becomes large, whereas the camber at a trailing end of the slider where the magnetic head 110 is mounted is small, which causes no problem in performance of the unit.

Meanwhile, in the structure, the gimbal 8 has a symmetrical shape, so that the productivity of the gimbal can be enhanced. Because the magnetic head slider supporting structure of this example is available for both of the magnetic heads for an upper face and a lower face of the magnetic disk (generally referred to as an UP head and a DOWN head), it is possible to improve the productivity and to reduce the production cost.

Figure 15:
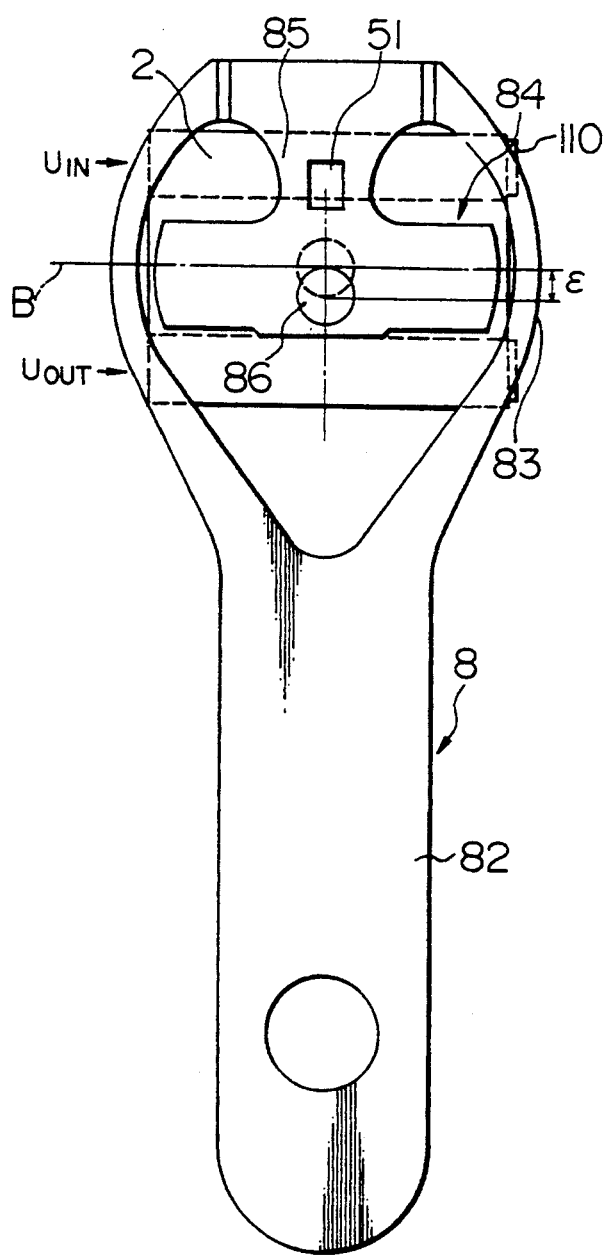
FIG. 15 is a plan view of a third embodiment of the supporting structure of the slider having the magnetic head slider according to the invention.

A third embodiment of the structure for supporting the magnetic head slider according to the invention will be described below with reference to FIG. 15.

The third embodiment is basically similar to the modified form of the second embodiment shown in FIG. 6. A different point between them is that the embossed portion 86 is located at a position offset from the longitudinal center line B of the slider 2 at a distance of $\epsilon$ toward an outer peripheral side of the magnetic disk 1.

According to the illustrated embodiment, by providing the embossed portion 86 at the position offset from the longitudinal center line B of the slider 2 at the distance $\epsilon$, it is possible to eliminate unbalance between flying heights of the rails of the slider 2 resulting from a difference between the magnetic disk peripheral speeds $U_{IN}$, $U_{OUT}$ at rails of the slider 2 on the inner and outer peripheral sides. Concretely, in a magnetic disk unit including magnetic disks with small diameters, the unfavorable unbalance (the difference between flying heights at the inner rail and at the outer rail) in the radial direction of the slider can be minimized effectively and easily. In this way, the flying height of the magnetic head can be reduced stably, thereby providing a magnetic disk unit with a high reliability.

Figure 16:
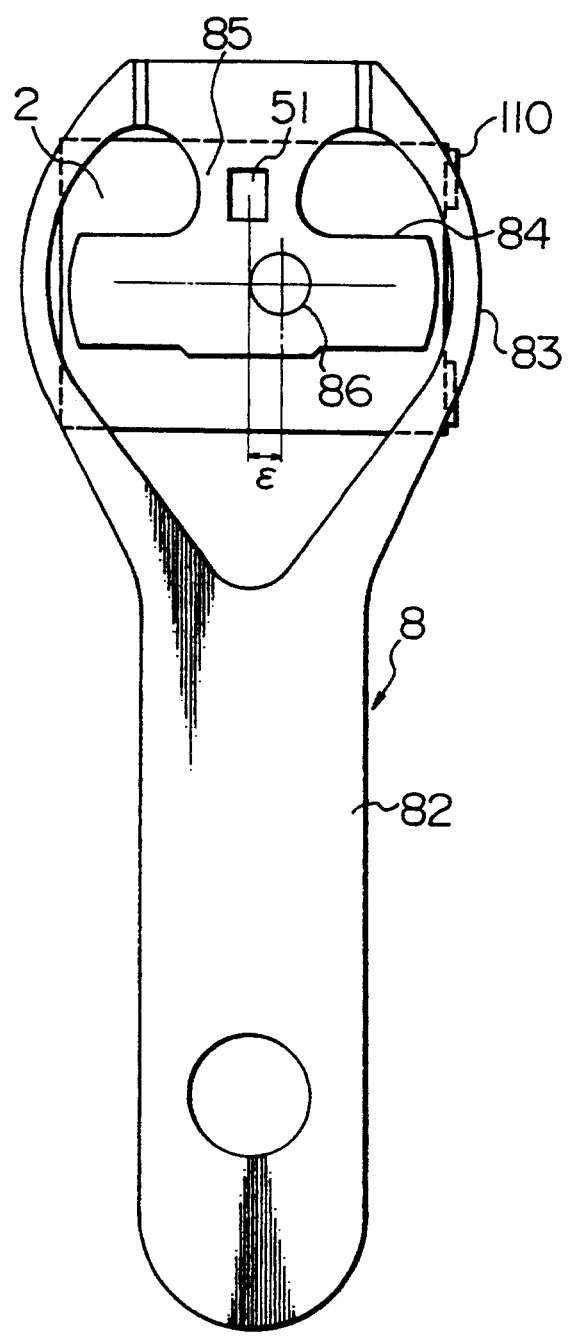
FIG. 16 is a plan view of a fourth embodiment of the supporting structure of the magnetic head slider according to the invention.

A fourth embodiment of the structure for supporting the magnetic head slider according to the invention will be explained hereinafter with reference to FIG. 16.

The fourth embodiment is also fundamentally similar to the modified form of the second embodiment shown in FIG. 6. A different point between them is that the embossed portion 86 is located at a position offset from a widthwise center line of the slider 2 at a distance $\epsilon$ toward the magnetic head.

With this structure, the point of application of load from the support arm 7 to the slider 2 can arbitrarily be changed, so that the posture of the slider 2 can easily be controlled.

In the above third and fourth embodiments, because only the position of the embossed portion 86 is changed, conventional tools for bonding and assembling the slider and the gimbal to each other are available as they are without changing the set values of the tools.

Figure 17:
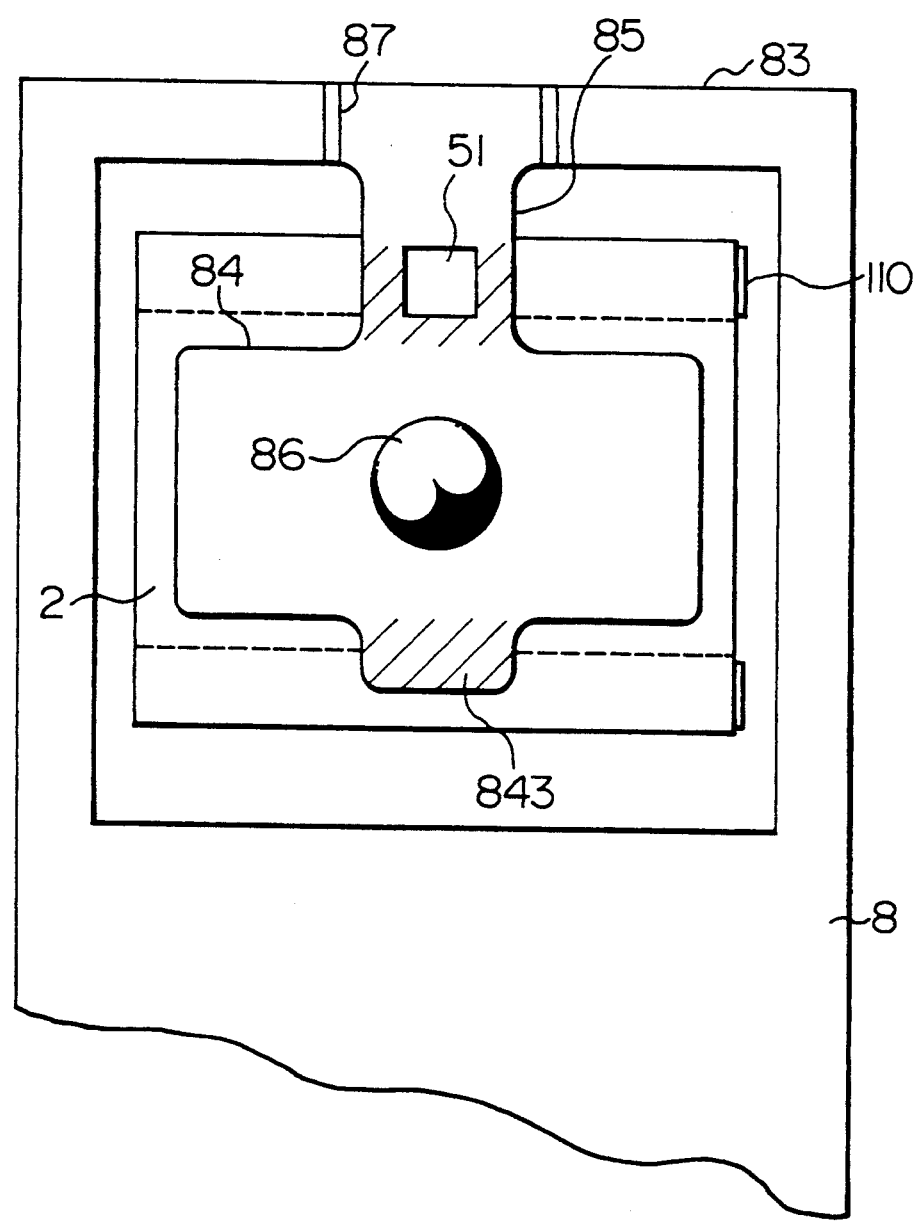
FIG. 17 is a plan view of a fifth embodiment of the supporting structure of the magnetic head slider according to the invention.

FIG. 17 shows a fifth embodiment of the invention. In the illustrated embodiment, effective bonding lengths (areas) of the extension 843 of the joining portion 84 and the bridging portion 85 with respect to the back surface of the slider, which areas are indicated by oblique lines in FIG. 17, are predetermined to be substantially equal to each other.

According to the fifth embodiment, effects similar to the above-described first embodiment can be expected. Also, since the effective bonding lengths (areas) of the extension 843 of the joining portion 84 and the bridging portion 85 with respect to the back surface of the slider, which areas are indicated by the oblique lines in FIG. 17, are predetermined to be substantially equal to each other, even if the camber slightly occurs in the inner rail and the outer rail of the slider 2 due to the adhesion, the amounts of camber in both the rails can be equalized. As a result, the unbalance of the flying heights in the widthwise direction of the slider due to the unbalance of the camber amounts in both the rails can be eliminated. Thus, it is possible to easily control the flying height of the slider and to enhance the productivity (yield).

According to the invention, the joining portion of the gimbal is adhered to the back surface of the slider from the leading end portion of the slider to the trailing end portion thereof in the longitudinal direction of the slider, so that the sufficiently large bonding area between the joining portion and the back surface of the slider can be obtained. As a result, even when the slider comes into contact with the magnetic disk, the dislodging of the slider from the gimbal can be prevented. Therefore, the performance and reliability of the magnetic disk unit can be improved remarkably.

Further, because the bonding length of the joining portion of the gimbal in the widthwise direction of the slider can be reduced, it is possible to decrease an amount of camber generated in the slider resulted from a difference between coefficients of thermal expansion of the gimbal and the slider. From this viewpoint, the reading and writing performance of the magnetic disk unit is not deteriorated. Moreover, such an accident that a portion of the slider may collide against the magnetic disk and damage the magnetic disk, can be prevented.

What is claimed is:

1. A structure for supporting a magnetic head slider for a linear magnetic disk unit comprising:
    a magnetic head slider having air bearing rails extending in a direction of a track of a magnetic disk, said rails facing to said magnetic disk;
    a gimbal for elastically supporting said magnetic head slider, which gimbal is adhered to a back surface of said magnetic head slider on a side opposite to said air bearing rails; and
    a support arm having said gimbal secured to its distal end, whose axis extends in a direction perpendicular to said air bearing rails, to apply to said magnetic head slider a force for pressing the slider against the magnetic disk,
    said gimbal including:
    a substantially rectangular joining portion having longer sides extending in a direction perpendicular to the axis of said support arm and shorter sides extending in the axial direction of said support arm, said joining portion being adhered to the back surface of said magnetic head slider;
    a bridging portion extending from a middle portion of the longer side of said joining portion on the side opposite to said support arm outwardly in the axial direction of said support arm, said bridging portion being adhered to said back surface;
    flexible portions extending from said bridging portion so as to surround said bridging portion and said joining portion; and
    a support portion extending from said flexible portions on a side opposite to said bridging portion rearward in the axial direction of said support arm.

2. A structure for supporting a magnetic head slider according to claim 1, wherein at least one substantially rectangular opening portion is provided on at least one of said joining portion and said bridging portion.

3. A structure for supporting a magnetic head slider according to claim 2, wherein said at least one rectangular opening portion provided on said joining portion has longer sides extending in a direction perpendicular to the axis of said support arm.

4. A structure for supporting a magnetic head slider according to claim 2, wherein said at least one rectangular opening portion provided on said bridging portion has longer sides extending in a direction perpendicular to the axis of said support arm.

5. A structure for supporting a magnetic head slider according to claim 1, wherein an embossed portion is formed substantially at a center of said joining portion, which embossed portion protrudes to the side opposite to said magnetic head slider to be in contact with a lower surface of said support arm at a distal end thereof, and said joining portion is adhered to a substantially central portion of the back surface of said magnetic head slider.

6. A structure for supporting a magnetic head slider according to claim 1, wherein an embossed portion is formed at a position offset from a center of said joining portion, which embossed portion protrudes to a side opposite to said magnetic head slider to be in contact with a lower surface of said support arm at a distal end thereof, and said joining portion is adhered to a substantially central portion of the back surface of said magnetic head slider.

7. A structure for supporting a magnetic head slider according to claim 6, wherein said embossed portion is formed at a position offset from the center of said joining portion toward the magnetic head of said magnetic head slider.

8. A structure for supporting a magnetic head slider according to claim 6, wherein said embossed portion is formed at a position offset from the center of said joining portion toward an outer peripheral side of said magnetic disk.

9. A structure for supporting a magnetic head slider according to claim 1, wherein an embossed portion is formed substantially at a center of said joining portion, which embossed portion protrudes to a side opposite to said magnetic head slider to be in contact with a lower surface of said support arm at a distal end thereof, and said joining portion is adhered to a position offset from a center of the back surface of said magnetic head slider.

10. A structure for supporting a magnetic head slider according to claim 9, wherein said joining portion is adhered to a position offset from the center of the back surface of said magnetic head slider toward an outer peripheral side of said magnetic disk.

11. A structure for supporting a magnetic head slider according to claim 9, wherein said joining portion is adhered to a position offset from the center of the back surface of said magnetic head slider toward the magnetic head.

12. A structure for supporting a magnetic head slider according to claim 10, wherein a portion of said joining portion on a side of the magnetic head protrudes from said magnetic head slider.

13. A structure for supporting a magnetic head slider according to claim 10, wherein a portion of said joining portion on the side of the magnetic head is provided with an extension which protrudes from said magnetic head slider.

14. A structure for supporting a magnetic head slider according to claim 13, wherein a portion of said joining portion on the side opposite to the magnetic head is also provided with an extension.

15. A structure for supporting a magnetic head slider according to claim 1, wherein said joining portion and said bridging portion exist on a common plane, said flexible portions and said support portion exist another common plane above said plane, and these two planes are connected to each other through stepped portions extending in the axial direction of said support arm.

16. A structure for supporting a magnetic head slider according to claim 1, wherein said joining portion is provided with an extension on the longer side on the side of said support arm, in opposition to said bridging portion, said extension is adhered to said back surface of said magnetic head slider, and an area of adhesion of said extension is substantially equal to an area of adhesion of said bridging portion.

17. A structure for supporting a magnetic head slider for a linear magnetic disk unit comprising:
   a magnetic head slider having air bearing rails extending in a direction of a track of a magnetic disk, said rails facing to said magnetic disk;
   a gimbal for elastically supporting said magnetic head slider, which gimbal is adhered to a back surface of said magnetic head slider on the opposite side to said air bearing rails; and
   a support arm having said gimbal secured to its distal end, whose axis extends in a direction perpendicular to said air bearing rails, to apply to said magnetic head slider a force for pressing the slider against the magnetic disk,
   said gimbal including:
   a substantially rectangular joining portion having longer sides extending in an extending direction of said air bearing rails and shorter sides extending in a direction perpendicular to the extending direction of said air bearing rails, said joining portion being adhered to the back surface of said magnetic head slider;
   a bridging portion extending from a middle portion of the longer side of said joining portion on the opposite side to said support arm outwardly in a direction perpendicular to the extending direction of said air bearing rails, said bridging portion being adhered to said back surface;
   flexible portions extending from said bridging portion so as to surround said bridging portion and said joining portion; and
   a support portion extending from said flexible portions on the side opposite to said bridging portion rearward in the direction perpendicular to the extending direction of said air bearing rails.

18. A structure for supporting a magnetic head slider according to claim 17, wherein at least one substantially rectangular opening portion is provided on at least one of said joining portion and said bridging portion.

19. A structure for supporting a magnetic head slider according to claim 18, wherein said at least one rectangular opening portion provided on said joining portion has longer sides extending in a direction perpendicular to the extending direction of said air bearing rails.

20. A structure for supporting a magnetic head slider according to claim 18, wherein said at least one rectangular opening portion provided on said bridging portion has longer sides extending in a direction perpendicular to the extending direction of said air bearing rails.

21. A structure for supporting a magnetic head slider according to claim 17, wherein an embossed portion is formed substantially at a center of said joining portion, which embossed portion protrudes to the side opposite to said magnetic head slider to be in contact with a lower surface of said support arm at the distal end thereof, and said joining portion is adhered to a substantially central portion of the back surface of said magnetic head slider.

22. A structure for supporting a magnetic head slider according to claim 17, wherein an embossed portion is formed at a position offset from a center of said joining portion, which embossed portion protrudes to the side opposite to said magnetic head slider to be in contact with a lower surface of said support arm at a distal end thereof, and said joining portion is adhered to a substantially central portion of the back surface of said magnetic head slider.

23. A structure for supporting a magnetic head slider according to claim 22, wherein said embossed portion is formed at a position offset from the center of said joining portion toward the magnetic head of said magnetic head slider.

24. A structure for supporting a magnetic head slider according to claim 22, wherein said embossed portion is formed at a position offset from the center of said joining portion toward the outer peripheral side of said magnetic disk.

25. A structure for supporting a magnetic head slider according to claim 17, wherein an embossed portion is formed substantially at a center of said joining portion, which embossed portion protrudes to the side opposite to said magnetic head slider to be in contact with a lower surface of said support arm at a distal end thereof, and said joining portion is adhered to a position offset from a center of the back surface of said magnetic head slider.

26. A structure for supporting a magnetic head slider according to claim 25, wherein said joining portion is adhered to a position offset from the center of the back surface of said magnetic head slider toward the magnetic head.

27. A structure for supporting a magnetic head slider according to claim 25, wherein said joining portion is adhered to a position offset from the center of the back surface of said magnetic head slider toward an outer peripheral side of said magnetic disk.

28. A structure for supporting a magnetic head slider according to claim 25, wherein a portion of said joining portion on the side of the magnetic head protrudes from said magnetic head slider.

29. A structure for supporting a magnetic head slider according to claim 25, wherein a portion of said joining portion on the side of the magnetic head is provided with an extension which protrudes from said magnetic head slider.

30. A structure for supporting a magnetic head slider according to claim 29, wherein a portion of said joining portion on the side opposite to the magnetic head is also provided with an extension.

31. A structure for supporting a magnetic head slider according to claim 17, wherein said joining portion and said bridging portion exist on a common plane, said flexible portions and said support portion exist another common plane above said plane, and these two planes are connected to each other through stepped portions extending in the direction perpendicular to the extending direction of said air bearing rails.

32. A structure for supporting a magnetic head slider according to claim 17, wherein said joining portion is provided with an extension on the longer side on the side of said support arm, in opposition to said bridging portion, said extension is adhered to said back surface of said magnetic head slider, and an area of adhesion of said extension is substantially equal to an area of adhesion of said bridging portion.

33. A structure for supporting a magnetic head slider for a linear magnetic disk unit comprising:

a slider with a magnetic head having air bearing rails extending in a direction of a track of a magnetic disk, said rails facing to said magnetic disk;

a gimbal for elastically supporting said magnetic head slider, which gimbal is adhered to a back surface of said magnetic head slider on a side opposite to to said air bearing rails; and a support arm having said gimbal secured to its distal end, whose axis extends in a direction perpendicular to said air bearing rails, to apply to said magnetic head slider a force for pressing the slider against the magnetic disk, said gimbal including:

a substantially rectangular joining portion having longer sides extending in a direction perpendicular to the axis of said support arm and shorter sides extending in the axial direction of said support arm, said joining portion being adhered to a position offset from a center of the back surface of said magnetic head slider toward the magnetic head so that a portion of the joining portion on the side of the magnetic head projects from the magnetic head;

a bridging portion extending from a middle portion of the longer side of said joining portion on the opposite side to said support arm outwardly in the axial direction of said support arm, said bridging portion including an opening portion formed therein and being adhered to said back surface;

flexible portions extending from said bridging portion so as to surround said bridging portion and said joining portion;

a support portion extending from said flexible portions on a side opposite to said bridging portion rearward in the axial direction of said support arm;

an embossed portion formed at a position offset from a center of said joining portion toward said support portion so as to project to a side opposite to said magnetic head slider, said embossed portion being in contact with a lower surface of said support arm at the distal end thereof;

an extension provided on the longer side of said joining portion on the side of said support arm so as to oppose to said bridging portion, said extension being adhered to said back surface of said magnetic head slider; and stepped portions for connecting said bridging portion and said flexible portion, said stepped portions extending in the axial direction of said support arm.

* * * * *